(12) United States Patent
Bejcek (10) Patent No.: US 10,624,262 B2
(45) Date of Patent: Apr. 21, 2020

(54) CLOSED-LOOP ELECTRONIC SLIPPING BELT TRANSMISSION SPEED CONTROL SYSTEM FOR A WALK-BEHIND LAWN MOWER

(71) Applicant: Honda Motor Co., Ltd., Tokyo (JP)

(72) Inventor: Andrew Edwin Bejcek, Chapel Hill, NC (US)

(73) Assignee: Honda Motor Co., Ltd., Tokyo (JP)

( * ) Notice: Subject to any disclaimer, the term of this patent is extended or adjusted under 35 U.S.C. 154(b) by 146 days.

(21) Appl. No.: 15/939,823

(22) Filed: Mar. 29, 2018

(65) Prior Publication Data
US 2019/0297776 A1    Oct. 3, 2019

(51) Int. Cl.
*F16H 9/04*    (2006.01)
*A01D 34/69*   (2006.01)
(Continued)

(52) U.S. Cl.
CPC .......... *A01D 34/69* (2013.01); *A01D 34/006* (2013.01); *F16H 9/04* (2013.01); *F16H 19/08* (2013.01); *F16H 35/06* (2013.01); *F16H 63/062* (2013.01); *F16H 63/304* (2013.01); *A01D 2034/6837* (2013.01); *A01D 2101/00* (2013.01); *B60W 10/107* (2013.01); *B60W 30/143* (2013.01);
(Continued)

(58) Field of Classification Search
CPC .............. B60W 10/107; B60W 30/143; Y10T 477/6237; F16H 59/44; F16H 61/662; F16H 2061/66204; F16H 61/66236; F16H 61/66231; F16H 7/08; F16H 2007/0823; F16H 7/10; F16H 63/304; F16H 9/04; F16H 63/062; F16H 2063/3066; A01D 34/69; A01D 34/006; A01D 2101/00; A01D 2034/3837
USPC .......................................................... 701/60
See application file for complete search history.

(56) References Cited

U.S. PATENT DOCUMENTS 4,907,407 A    3/1990  Nemoto et al.
4,999,774 A *  3/1991  Tokoro .................. B60W 30/18
                                                        477/46
(Continued)

OTHER PUBLICATIONS

International Search Report and Written Opinion of PCT/US2018/065337 dated Mar. 8, 2019, 14 pages.

*Primary Examiner* — Roger L Pang
(74) *Attorney, Agent, or Firm* — Mark E. Duell; Rankin, Hill & Clark LLP (57) ABSTRACT

A transmission speed control system for a walk-behind lawn mower includes a transmission, a transmission positioning assembly, and an electronic control unit. The transmission is tiltable about and operably engaged with a drive axle shaft. The transmission positioning assembly tilts the transmission between first and second angular positions. A belt tension between a drive belt and a transmission pulley of the transmission continuously increases from a minimum belt tension when the transmission is in the first angular position to a maximum belt tension when the transmission is in the second angular position. The rotational drive force exerted on the drive axle shaft by the transmission and a resulting driving speed of the lawn mower vary proportionally with the belt tension. The electronic control unit controls the transmission positioning assembly to tilt the transmission based on target and detected driving speeds.

17 Claims, 7 Drawing Sheets

(51) Int. Cl.
    *A01D 34/00*     (2006.01)
    *F16H 35/06*     (2006.01)
    *F16H 63/06*     (2006.01)
    *F16H 63/30*     (2006.01)
    *F16H 19/08*     (2006.01)
    *A01D 34/68*     (2006.01)
    *A01D 101/00*     (2006.01)
    *B60W 30/14*     (2006.01)
    *B60W 10/107*     (2012.01)
    *F16H 59/44*     (2006.01)
    *F16H 61/662*     (2006.01)
    *F16H 7/08*     (2006.01)
    *F16H 7/10*     (2006.01)

(52) U.S. Cl.
    CPC ............... *F16H 7/08* (2013.01); *F16H 7/10* (2013.01); *F16H 59/44* (2013.01); *F16H 61/662* (2013.01); *F16H 61/66231* (2013.01); *F16H 61/66236* (2013.01); *F16H 2007/0823* (2013.01); *F16H 2061/66204* (2013.01); *F16H 2063/3066* (2013.01); *Y10T 477/6237* (2015.01)

(56) References Cited

U.S. PATENT DOCUMENTS

| | | | |
|---|---|---|---|
| 5,718,105 A | 2/1998 | Irikura et al. | |
| 6,082,083 A * | 7/2000 | Stalpes | A01D 34/6806 56/10.8 |
| 6,475,109 B2 | 11/2002 | Blanchard | |
| 7,217,206 B2 | 5/2007 | Stone et al. | |
| 8,840,495 B2 | 9/2014 | Comsa et al. | |
| 9,055,713 B2 | 6/2015 | Helgesen et al. | |
| 9,151,366 B2 | 10/2015 | Antchak et al. | |
| 9,326,446 B2 | 5/2016 | Cmich et al. | |
| 9,334,932 B2 | 5/2016 | Antchak et al. | |
| 9,456,546 B2 | 10/2016 | Blanchard | |
| 9,464,697 B2 | 10/2016 | Antchak et al. | |
| 9,622,407 B2 | 4/2017 | Helgesen et al. | |
| 9,638,293 B2 | 5/2017 | Mueller et al. | |
| 9,730,382 B2 | 8/2017 | Baker | |
| 9,730,383 B2 | 8/2017 | Greulich et al. | |
| 2002/0178708 A1* | 12/2002 | Williams | A01D 34/69 56/10.8 |
| 2005/0066758 A1 | 5/2005 | Marcell et al. | |
| 2005/0166565 A1 | 8/2005 | Adams et al. | |
| 2005/0252185 A1* | 11/2005 | Osborne | A01D 34/6806 56/10.8 |
| 2005/0282668 A1 | 12/2005 | Ali et al. | |
| 2006/0128521 A1* | 6/2006 | Fukushima | B60W 10/06 477/5 |
| 2009/0191992 A1* | 7/2009 | Osborne | A01D 34/6806 474/12 |
| 2010/0139227 A1 | 6/2010 | Johansson | |
| 2011/0000175 A1* | 1/2011 | Lahey | A01D 34/68 56/10.8 |
| 2013/0081500 A1* | 4/2013 | Helin | A01D 34/6806 74/473.3 |
| 2015/0135671 A1 | 5/2015 | Helgesen et al. | |
| 2017/0073916 A1 | 3/2017 | Palicki et al. | |
| 2017/0101010 A1* | 4/2017 | Omran | B60W 10/11 |
| 2017/0114875 A1* | 4/2017 | Yoshimura | E01H 5/098 |
| 2017/0164552 A1* | 6/2017 | Jackson | A01D 34/824 |
| 2017/0188511 A1 | 7/2017 | Helgesen et al. | |

\* cited by examiner

CLOSED-LOOP ELECTRONIC SLIPPING BELT TRANSMISSION SPEED CONTROL SYSTEM FOR A WALK-BEHIND LAWN MOWER

BACKGROUND

To translate power from an engine of a walk-behind (self-propelled) lawn mower to a drive wheel to propel the lawn mower, a slipping belt transmission system can be employed. In the slipping belt transmission system, a transmission operably engages and pivots about a drive axle shaft, which engages a drive wheel to affect a driving rotation thereof. When the transmission tilts in a first direction toward the engine (i.e., in a forward direction when the drive axle shaft is adjacent to a rear axle) to a disengaged state position, a belt tension acting on a drive belt connecting the transmission and the engine is decreased to increase belt slip and place the transmission in a disengaged state where power is not transmitted from the engine to drive the drive wheel via the drive axle shaft. When the transmission tilts, from the disengaged state position, in a second direction away from the engine (i.e., in a rearward direction when the drive axle shaft is adjacent to the rear axle) to an engaged state position, the belt tension acting on the drive belt connecting the transmission and the engine is increased to decrease belt slip and place the transmission in an engaged state where power is transmitted from the engine to drive the drive wheel via the drive axle shaft. The engaged state position can be a tilt position at which the transmission is level, i.e., not tilted.

The transmission is biased, e.g., via a return spring secured to a frame of the lawn mower, to tilt in the first direction to be in the disengaged state position. As such, when the lawn mower engine is started, the lawn mower may not driven by the drive wheel until some control is made to counteract the biasing of the transmission to tilt in the first direction. This control can be carried out by actuating a clutch cable which pulls the transmission to tilt in the second direction to the engaged state position. The clutch cable can be secured to the transmission and connected to a mechanical operation lever on an operation handle of the lawn mower, which can be actuated by a user during lawn mower operation.

This slipping belt transmission system allows the user to control power supply to the drive wheel to propel the lawn mower. However, it does not allow for the drive speed of the lawn mower to be accurately controlled using the operation lever, particularly on relatively smooth surfaces with low rolling resistance.

BRIEF DESCRIPTION

According to one aspect, a transmission speed control system for a walk-behind lawn mower allows for precise speed control and includes a transmission and a transmission positioning assembly. The transmission includes a transmission pulley adapted to engage and be rotatably driven by a drive belt driven by an engine of the lawn mower. The transmission is configured to translate rotation of the transmission pulley to a rotational drive force exerted on a drive axle shaft of the lawn mower to drive the lawn mower. The transmission is provided to be tiltable between a first angular position and a second angular position within the lawn mower. The transmission positioning assembly includes a motor and a gear assembly secured to a frame of the lawn mower and the transmission. The gear assembly translates a drive force from the motor to tilt the transmission to and hold the transmission at any angular position between the first angular position and the second angular position. A belt tension between the drive belt and the transmission pulley continuously increases from a minimum belt tension when the transmission is in the first angular position to a maximum belt tension when the transmission is in the second angular position. The rotational drive force exerted on the drive axle by the transmission and a resulting driving speed of the lawn mower vary proportionally with the belt tension.

According to another aspect, a walk-behind lawn mower includes a frame, an engine mounted on the frame, a drive axle shaft secured to the frame and having a drive wheel, a drive pulley driven by the engine and engaging and driving a drive belt, and a transmission speed control system for driving the drive axle shaft. The transmission speed control system includes a transmission and a transmission positioning assembly. The transmission includes a transmission pulley adapted to engage and be rotatably driven by the drive belt. The transmission is configured to translate rotation of the transmission pulley to a rotational drive force exerted on the drive axle shaft to drive the lawn mower. The transmission is provided to be tiltable between a first angular position and a second angular position within the lawn mower. The transmission positioning assembly includes a motor and a gear assembly secured to the frame and the transmission. The gear assembly translates a drive force from the motor to tilt the transmission to and hold the transmission at any angular position between the first angular position and the second angular position. A belt tension between the drive belt and the transmission pulley continuously increases from a minimum belt tension when the transmission is in the first angular position to a maximum belt tension when the transmission is in the second angular position. The rotational drive force exerted on the drive axle by the transmission and a resulting driving speed of the lawn mower vary proportionally with the belt tension.

According to yet another aspect, a method for controlling a driving speed of a walk-behind lawn mower is provided using a transmission speed control system. The transmission speed control system includes a transmission, a transmission positioning assembly, and an electronic control unit. The transmission includes a transmission pulley adapted to engage and be rotatably driven by a drive belt driven by an engine of the lawn mower. The transmission is configured to translate rotation of the transmission pulley to a rotational drive force exerted on a drive axle shaft of the lawn mower to drive the lawn mower. The transmission is provided to be tiltable between a first angular position and a second angular position within the lawn mower. The transmission positioning assembly includes a motor and a gear assembly secured to a frame of the lawn mower and the transmission. The gear assembly translates a drive force from the motor to tilt the transmission to and hold the transmission at any angular position between the first angular position and the second angular position. The electronic control unit includes at least one processor and controls the transmission positioning assembly to adjust the angular position of the transmission. A belt tension between the drive belt and the transmission pulley continuously increases from a minimum belt tension when the transmission is in the first angular position to a maximum belt tension when the transmission is in the second angular position. The rotational drive force exerted on the drive axle by the transmission and a resulting driving speed of the lawn mower vary proportionally with the belt tension. The method includes: determining, using the electronic control unit, a target driving speed of the lawn mower;

determining, using the electronic control unit, a target angular position of a transmission, which is the angular position of the transmission that yields the belt tension that causes the transmission to exert the rotational drive force on the drive axle shaft to drive the lawn mower at the target driving speed; and controlling, using the electronic control unit, the transmission positioning assembly to adjust the angular position of the transmission to the target angular position.

DETAILED DESCRIPTION

The following includes definitions of selected terms employed herein. The definitions include various examples and/or forms of components that fall within the scope of a term and that can be used for implementation. The examples are not intended to be limiting. Further, the components discussed herein can be combined, omitted or organized with other components or organized into different architectures.

Figure 1:
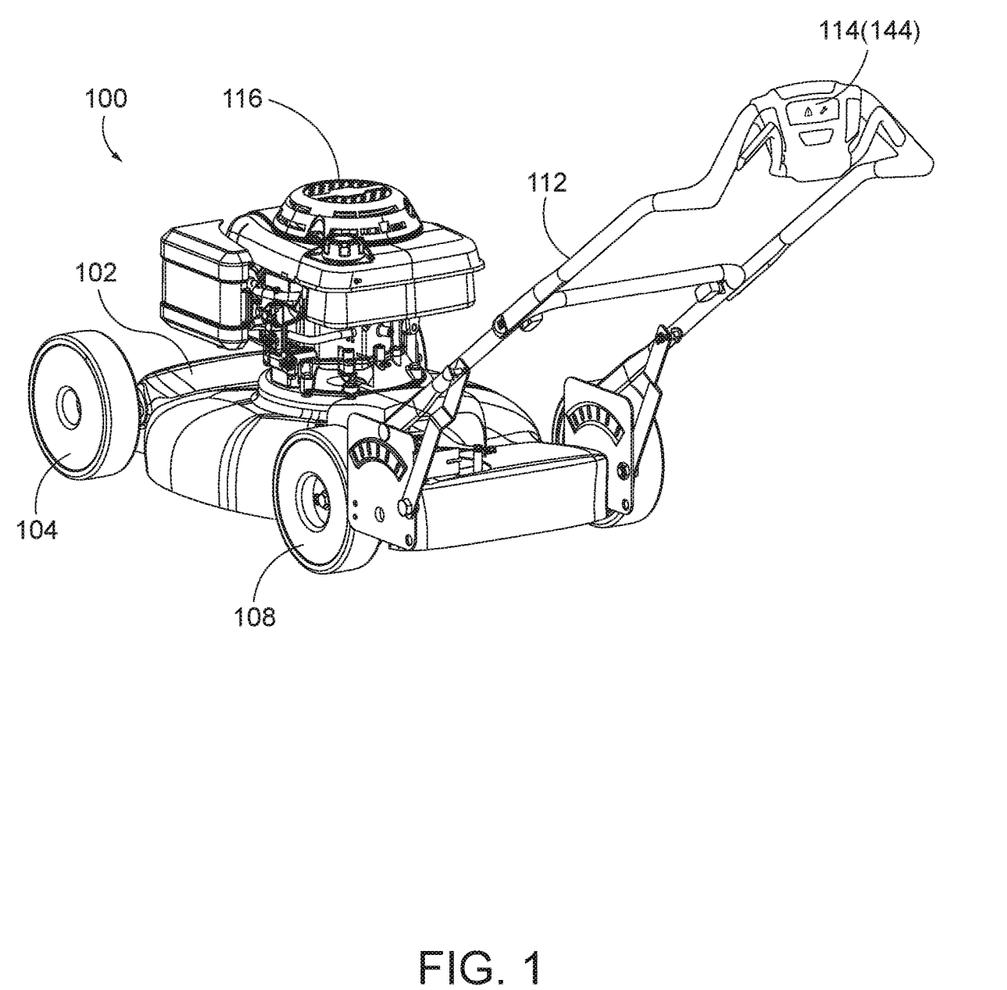
FIG. 1 is a rear perspective view of a walk-behind lawn mower in accordance with an embodiment of the present application.
Figure 2:
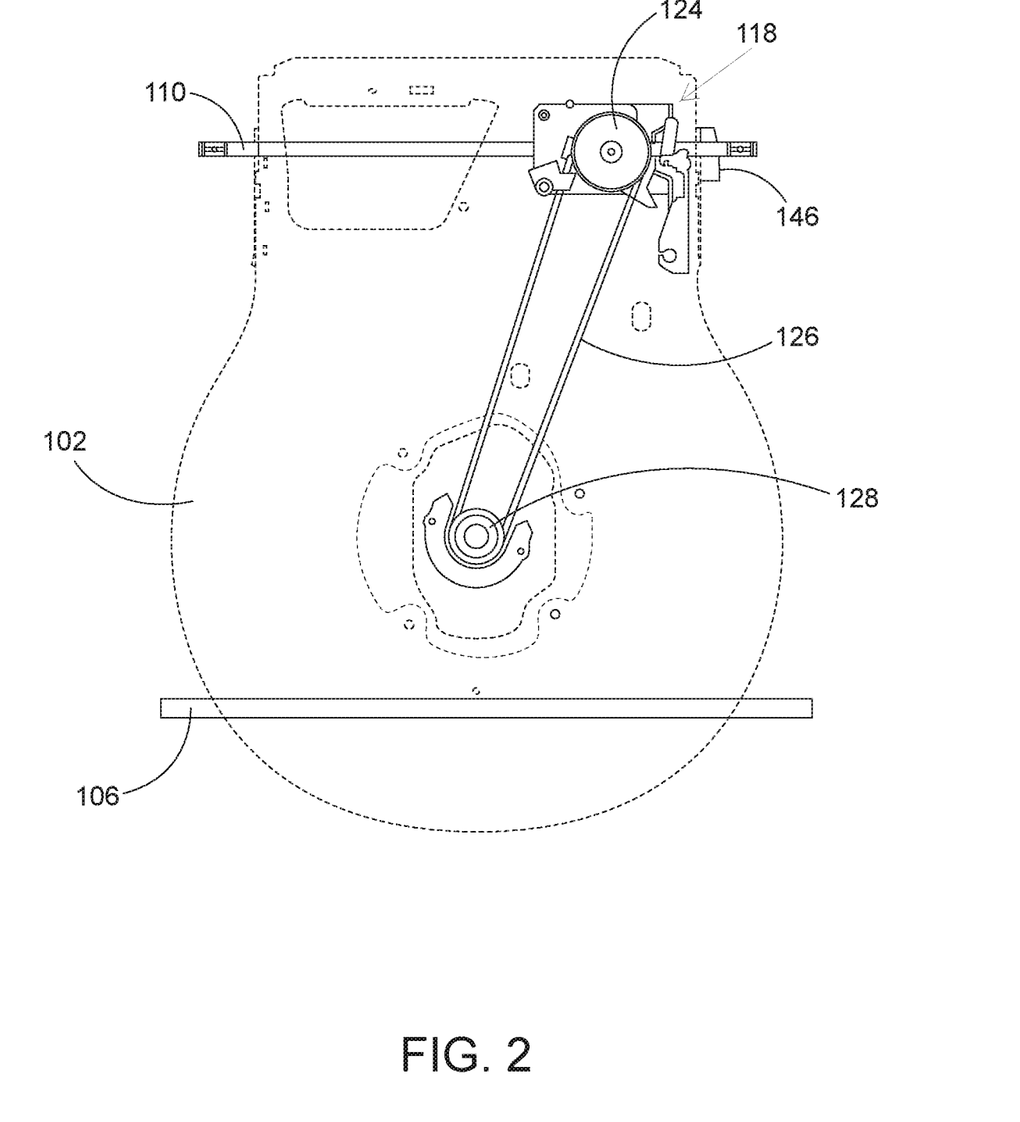
FIG. 2 is a partial sectional plan view of operational components of the lawn mower.

Referring to FIGS. 1 and 2, a walk-behind (self-propelled) lawn mower 100 includes a frame 102 which supports front wheels 104 on a front axle 106, rear wheels 108 driven by a rear axle 110, and an operation handle 112 on which a user interface 114 is provided to allow a user to control the lawn mower 100. The operation handle 112 extends upward from a rear longitudinal portion of the lawn mower 100 to a height at which the operation handle 112 can be gripped by the user. The user interface 114 can include a computer-enabled digital display operable via control buttons, a touch screen computer display, or any control mechanisms that, e.g., allow the user to turn the lawn mower 100 on and off, control a driving speed of the lawn mower, a blade/cutting height of the lawn mower 100, etc.

The frame 102 also supports an engine 116 which drives a mower blade (not shown) and a drive wheel to drive (self-propel) the lawn mower 100 so a user can walk behind the lawn mower 100, rather than needing to push the lawn mower 100. For the purpose of this description, the rear wheels 108 will be described as being drive wheels. However, it is to be appreciated that any one or more of the rear wheels 108 and the front wheels 104 can be used as the drive wheel.

The rear wheels 108 are driven as the drive wheels through the operable engagement of the engine 116 with the rear axle 110, which serves as and is referenced below as being a drive axle shaft, via a transmission speed control system 118. The drive axle shaft 110 can drive the rear wheels 108 through an operable engagement therewith, e.g., through a system of gears (not shown) that can include a pinion gear on an end of the drive axle shaft 110 which operably engages and drives a spur gear on the rear wheels 108 (or a single one of the rear wheels 108). It is to be appreciated that when the drive wheel(s) is(are) a front wheel, the drive axle shaft 110 could be the front axle 106, which could engage one or both of the front wheels 104 in a similar manner.

Figure 3:
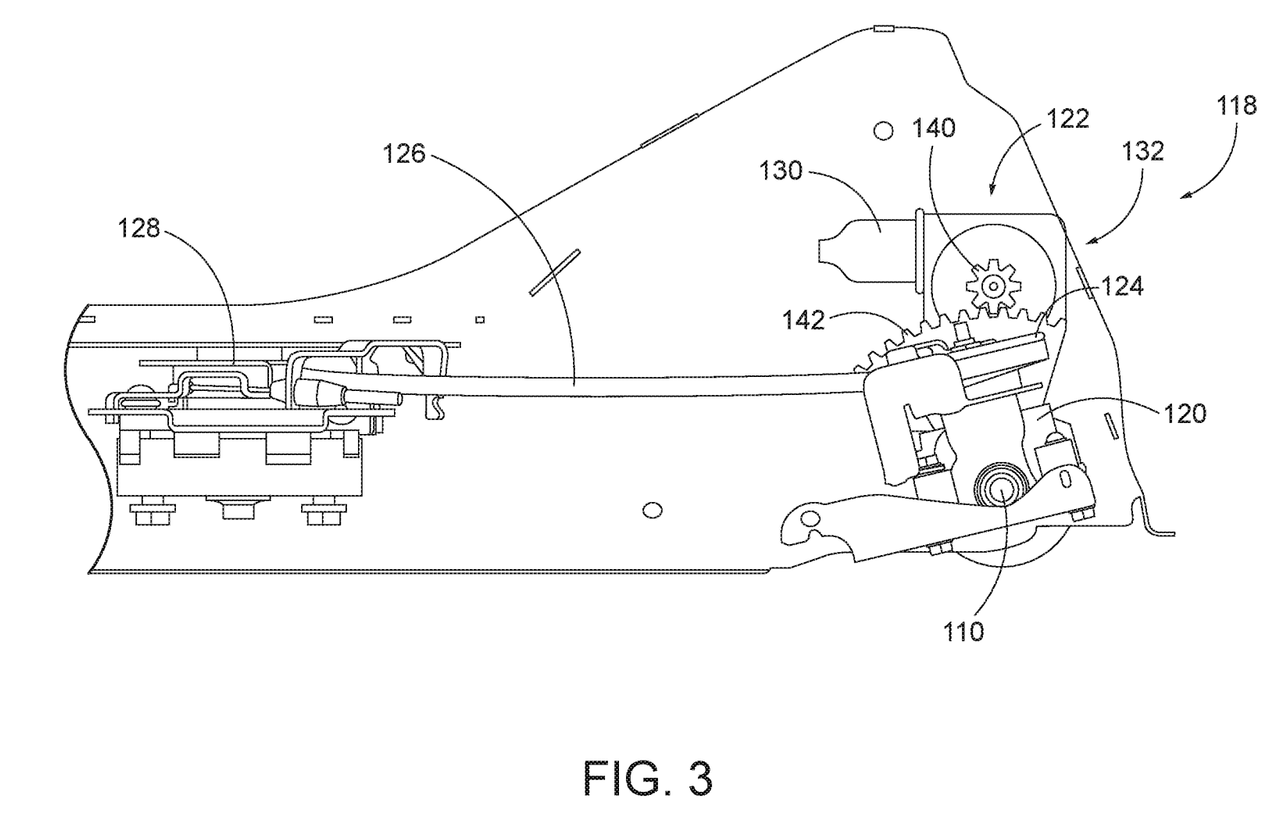
FIG. 3 is a partial sectional side view of operational components of the lawn mower, showing a transmission of a transmission speed control system of the lawn mower in a first angular position.
Figure 4:
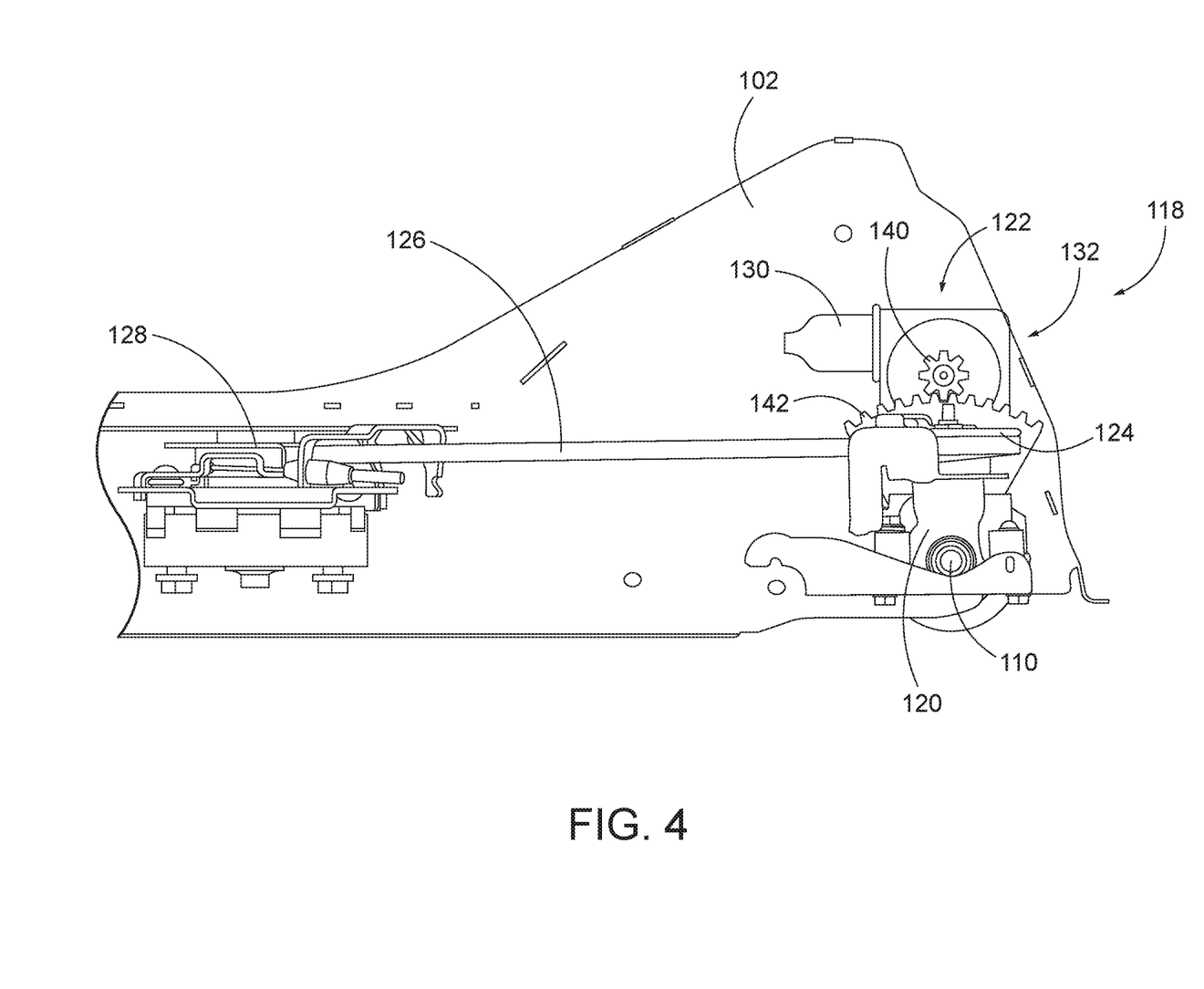
FIG. 4 is a partial sectional side view of operational components of the lawn mower, showing the transmission of the transmission speed control system of the lawn mower in a second angular position.

As shown in FIGS. 3 and 4, the transmission speed control system 118 includes a transmission 120 and a transmission positioning assembly 122. The transmission 120 is operably secured to the drive axle shaft 110 with the drive axle shaft 110 passing therethrough, so that the transmission 120 is tiltable by rotating about the drive axle shaft 110 with an axis of rotation of the transmission 120 to change an angular position thereof being along an axial direction of the drive axle shaft 110. The transmission positioning assembly 122, as described in detail below, is operable to tilt and hold the transmission 120 about the drive axle shaft 110.

The transmission 120 includes a transmission pulley 124 which engages and is driven by a drive belt 126, which engages and is driven by a drive pulley 128 driven by the engine 116. The transmission 120 is configured to translate rotation of the transmission pulley 124, as the transmission pulley 124 is driven by the engine 116 via the drive belt 126 and drive pulley 128, to a rotational drive force (torque) exerted on the drive axle shaft 110 to drive the lawn mower 100. In this regard, the transmission 120 operably engages the drive axle shaft 110 to drive the drive axle shaft 110 to rotate using known transmission mechanisms (e.g., an assembly of gears, etc.)

The transmission positioning assembly 122 is mounted on the frame 102 to engage the transmission 120 to tilt the transmission 120 about its axis of rotation. The transmission positioning assembly 122 includes a motor 130 and a gear assembly 132, with the gear assembly including a component secured to the transmission 120 and configured to translate a driving force of the motor 130 to tilt the transmission 120 and hold the transmission 120 at an angular position.

To drive the gear assembly 132 to cause the transmission 120 to tilt in each of two directions, the motor 130 may be configured to selectively drive in two directions. Furthermore, the motor 130 may include or be connected to a power source (not shown), such as a battery, or may share a power source with the user interface 114 or may be powered by the engine 116.

Figure 5:
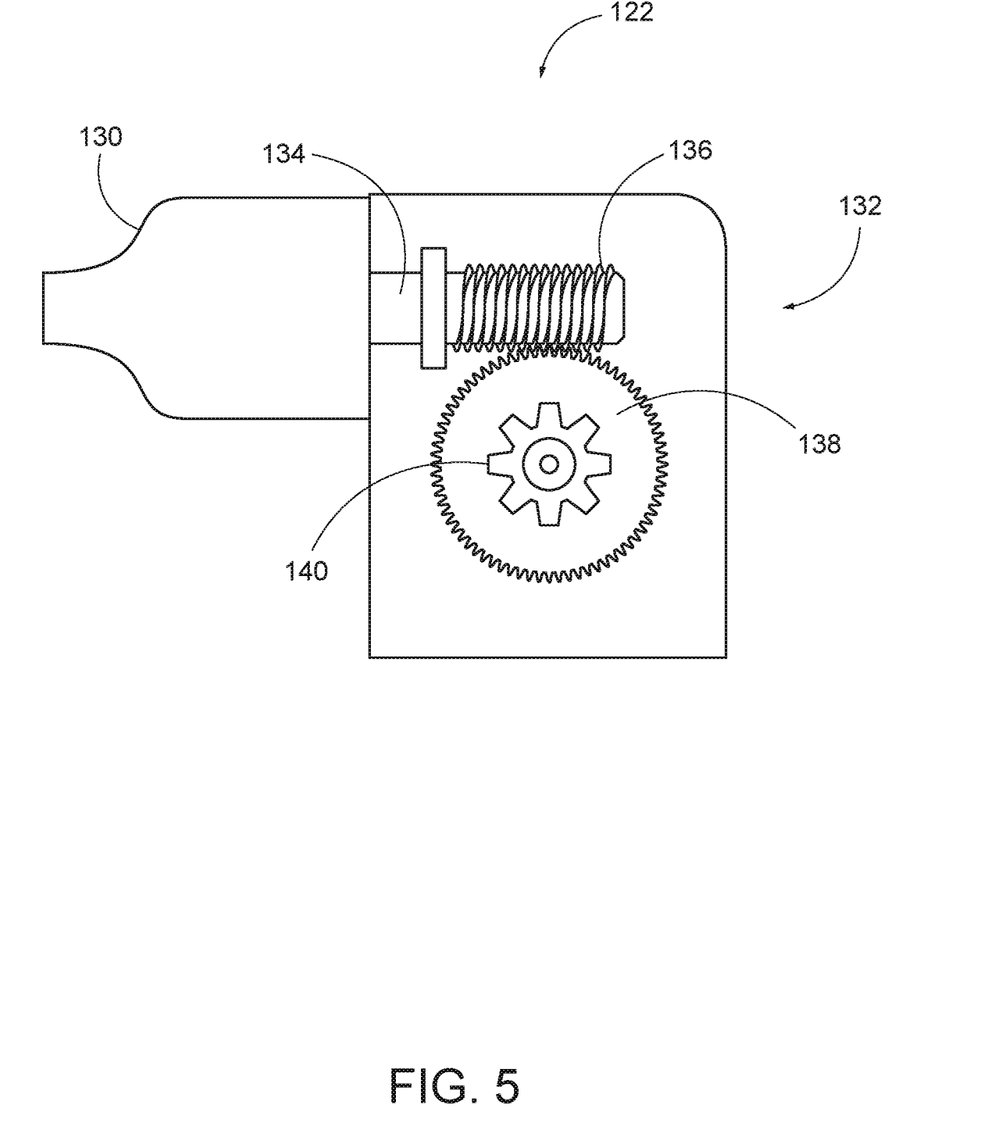
FIG. 5 is a sectional schematic illustration of a transmission positioning assembly of the transmission speed control system of the lawn mower.

To translate the driving force of the motor 130 to tilt the transmission 120 and to allow for the transmission 120 to be held at selection angular positions with minimal power input, the gear assembly 132 can cooperate with the motor 130 to form a worm gear drive which is driven by motive power of the motor 130. The worm gear drive configuration is shown in detail in FIG. 5, wherein the motor 130 includes an output shaft 134 which is driven to rotate. The output shaft 134 is fixedly connected to or integrally formed with a worm 136 of the gear assembly 132, so that the worm 136 integrally rotates with the output shaft 134 of the motor 130. An external surface of the worm 136 is threaded and threadedly engages gear teeth formed on an outer circumferential surface of a worm wheel 138. The threaded engagement between the worm 136 and the worm wheel 138 is such that the worm wheel 138 is driven to rotate by rotation of the worm 136. The axis of rotation of the worm wheel 138 is perpendicular to that of the worm 136. A spur gear 140 of the gear assembly 132 is fixedly connected to or integrally formed with the worm wheel 138 to integrally rotate therewith about a common axis of rotation. The combination of the motor 130 and the output shaft 134, worm 136, worm wheel 138, and spur gear 140 of the gear assembly 132 can be a window regulator.

Returning to FIGS. 3 and 4, the gear assembly 132 further includes a transmission angle control plate 142 which is fixedly connected to the transmission 120. The transmission angle control plate 142 is operably engaged with the spur gear 140 to change the angular position of the transmission 120 (by tilting about the drive axle shaft 110) as the spur gear 140 is rotated by driving of the motor 130. The transmission angle control plate 142 may, as shown, have an arc shaped surface on which gear teeth are provided to engage with gear teeth of the spur gear 140, which causes the transmission 120 to rotate as the transmission angle control plate 142 is driven by rotation of the spur gear 140.

The motor 130, by rotating the output shaft 134 in two different directions, drives the spur gear 140 in a first direction and a second direction. For purposes of this description, the first direction is a clockwise direction and the second direction is a counterclockwise direction. When the spur gear 140 is driven in the first direction, the transmission angle control plate 142 is driven to move toward a front portion of the lawn mower 100 and rotate in a counterclockwise direction due to the arc shaped surface on which the gear teeth are provided, which in turn causes the transmission 120 fixedly secured to the transmission angle control plate 142 to integrally rotate about the drive axle shaft 110 so as to tilt in a forward direction (rotate in the counterclockwise direction). When the spur gear 140 is driven in the second direction, the transmission angle control plate 142 is driven to move toward a rear portion of the lawn mower 100 and rotate in the clockwise direction, which causes the transmission 120 fixedly secured to the transmission angle control plate 142 to integrally rotate about the drive axle shaft 110 so as to tilt in a rearward direction (rotate in the clockwise direction).

Through this action, the transmission 120 can be tilted to any angular position between a first angular position (shown in FIG. 3), at which the transmission 120 is maximally tilted in the forward direction, and a second angular position (shown in FIG. 4), at which the transmission 120 is maximally tilted in the rearward direction. The maximum ranges for the forward and rearward tilting can be controlled based on a length and angle of the transmission angle control plate 142, and by controlling a drive amount of the spur gear 140 by the motor 130.

Furthermore, by employing the worm gear drive described above (and shown in FIG. 5), the transmission 120 can be held at any of the angular positions between the first and second angular positions, with relatively little output from the motor 130. In this regard, without the worm gear drive, the gear assembly 132 could be back-driven by the drive belt 126.

In the first angular position shown in FIG. 3, the transmission 120 is tilted in the forward direction so that a front portion of the transmission 120 in a longitudinal direction of the lawn mower 100, which is perpendicular to an axial direction of the drive axle shaft 110, is disposed relatively lower in a height direction, which is perpendicular to the axial direction of the drive axle shaft 110 and the longitudinal direction of the lawn mower 100, than a rear portion of the transmission 120 in the longitudinal direction of the lawn mower 100. In the second angular position shown in FIG. 4, the rear portion of the transmission 120 may be disposed substantially level in the height direction with the front portion of the transmission 120 (i.e., the transmission 120 can have no tilt, e.g., the transmission pulley can be oriented to define a path for the drive belt 126 which is substantially parallel to a ground surface), or relatively below the front portion of the transmission 120 in the height direction.

As the angular position of the transmission 120 changes, the angular position of the transmission pulley 124 changes integrally therewith. This change of angular position results in a change in a belt tension between the drive belt 126, the transmission pulley 124, and the drive pulley 128. Specifically, the belt tension continuously increases from a minimum belt tension when the transmission 120 is in the first angular position to a maximum belt tension when the transmission 120 is in the second angular position. The change in belt tension is due to changes in a relative distance between the drive pulley 128 and the transmission pulley 124 as the transmission 120, on which the transmission pulley 124 is mounted, is tilted/rotated about the drive axle shaft 110.

The belt tension is inversely related to belt slip, so that belt slip decreases as belt tension increases, and belt slip increases as belt tension decreases. Consequently, the rotational drive force exerted on the drive axle shaft 110 by the transmission 120 and a resulting driving speed of the lawn mower 100 vary directly and proportionally with the belt tension. Accordingly, the driving speed of the lawn mower 100 can be controlled and adjusted by tilting the transmission 120 to adjust the angular position of the transmission 120. The relationship between the angular position of the transmission 120, the belt tension, the belt slip, the rotational drive force exerted on the drive axle shaft 110 by the transmission 120, and the expected resulting driving speed of the lawn mower 100 may be determined experimentally or via known mathematical/geometric relationships, taking into account all specific aspects of the configuration of the lawn mower 100.

Naturally, various external factors may contribute to the actual driving speed achieved by modification of the angular position of the transmission 120, such as a driving load of the lawn mower 100 (tall grass vs. short grass, etc.) and whether the lawn mower 100 is being operated on an incline. These factors may be deemed outside of the expected resulting driving speed and accounted for according to a process described below. Alternatively, these factors can be measured or otherwise detected, and used to determine the adjustment of the angular position of the transmission 120.

With reference to the above-discussed first and second angular positions of the transmission 120, the second angular position at which the maximum belt tension is realized corresponds to a maximum driving speed (insofar as the driving speed can be adjusted by tilting of the transmission 120). The first angular position at which the minimum belt tension is realized corresponds to either a minimum driving speed (insofar as the driving speed can be adjusted by tilting of the transmission 120) or a stopped state in which the lawn mower 100 is not driven (self-propelled) as the transmission 120 is tilted to a degree that the transmission pulley 124 and/or the engine pulley 128 is/are effectively disengaged from the drive belt 126.

To control the driving speed of the lawn mower 100, the transmission speed control system 114 can include an electronic control unit 144 ("ECU 144") which communicates with and controls the motor 130 of the transmission positioning assembly 122, among other elements of the lawn mower 100. The ECU 144 may be configured by one or more processors, one or more memory units (including RAM and ROM), and software enabling the below described functions of the ECU 144. The ECU 144 can communicate with the motor 130 and the user interface 114 via any known wired or wireless protocols, and through such communication is capable of communicating with the user interface 114 and controlling the motor 130 to drive the spur gear 140 in the first and second directions, which in turns adjusts the angular position of the transmission 120. To this end, the ECU 144 can include an H-bridge motor driver for driving the motor 130 in each of the two directions.

The ECU 144, as shown in FIG. 1, can be provided in the user interface 114 and share a power source therewith. It is to be appreciated the ECU 144 can be provided separately from the user interface 114 and even remotely from the lawn mower, in which case the lawn mower could include some means for communicating with the external ECU, such as through known wired or wireless communication protocols. The ECU 144 can also function to control and enable the user interface 114, such as when the user interface 114 is a computer enabled interface, such as a computer-implemented digital display, a touch screen computer display, etc.

Regardless of the specific manner in which the user interface 114 is provided, the user interface 114 includes user operated controls that, among other features, allow the user to specify a target driving speed of the lawn mower 100, which is received as an input by the ECU 144. The target driving speed of the lawn mower 100 can be set as a selection amongst a plurality of general speed settings (e.g., "Slow", "Medium", "Fast") or to a specific speed (e.g., "3.0 miles per hour", "3.5 miles per hour", etc.) Even where the target speed is set generally, the ECU 144 translates the general speed setting to a specific speed (e.g., "Slow" translates to 1.5 miles per hour, "Medium" translates to 2.5 miles per hour, and "Fast" translates to 3.5 miles per hour).

The ECU 144 can, alternatively or additionally, include programming and communicate with sensors that allow the ECU 144 to set the target driving speed via other known mechanisms for user input or automatically. For example, the ECU 144 could communicate with certain sensors to determine the preferred walking speed of the user and to set the preferred walking speed as the target driving speed. As a further alternative, the ECU 144 could set the target driving speed arbitrarily (e.g., if there is a single speed setting), or based on a driving speed of other lawn mowers working in tandem with the lawn mower 100. The transmission speed control system 118 is considered to be amenable to operation with any manner of target driving speed determination.

The ECU 144 is further programmed to determine a target angular position of the transmission 120 based on the target driving speed. The target angular position of the transmission 120 is the angular position of the transmission 120 that, under ordinary driving conditions, yields the belt tension that causes the transmission 120 to exert the rotational drive force (torque) on the drive axle shaft 110 to drive the lawn mower 100 at the target driving speed. The determination of the target angular position of the transmission 120 will be made as a calculation, via reference to a look-up table stored in the memory of the ECU 144, or via other known determination means. The basis for the calculation, or the determination of values in the look-up table, will depend on the structural configuration of the transmission speed control system 118, notably, the amount of belt tension applied at each angular position of the transmission 120, the resultant rotational drive force exerted by the transmission 120 on the drive axle shaft 110, the dimensions of the spur gear 140 and transmission angle control plate 142, and the output of the motor 130. These parameters can be accounted for in the programming of the ECU 144 and/or the creation of the look-up table through experimental determination or calculation, and employed via known mathematical protocols into the programming of the ECU 144. Furthermore, as noted above, the ECU 144 can be configured to receive inputs from various sensors or detectors that measure external factors, such as a length of grass being mowed and/or an incline on which the lawn mower 100 is being operated, and use these inputs to determine the target angular position of the transmission 120 to yield the target driving speed in the measured/detected environment in which the lawn mower 100 is operating.

The ECU 144 then controls the motor 130 of the transmission positioning assembly 122 to adjust the angular position of the transmission 120 to the target angular position determined based on the target driving speed. The transmission speed control system 118 can thereby control the driving speed of the lawn mower 100.

The driving speed of the lawn mower 100 can be precisely controlled as described above during ordinary driving conditions. In embodiments where external factors are not considered in determining the target angular position of the transmission 120, ordinary driving conditions can include, for example, driving the lawn mower 100 on level ground without significant deterioration of the driving parts of the lawn mower 100, through grass or other surface which is not overgrown or especially short. In embodiments where external factors are considered in determining the target angular position of the transmission 120, ordinary driving conditions can include, for example, driving the lawn mower 100 without significant deterioration of the driving parts, and without affect by external factors which are not detected or measured, or which are not accurately measured or detected.

It is to be appreciated that the driving speed control can become less precise when the lawn mower 100 is operated outside of ordinary driving conditions. For example, when the lawn mower 100 is driven on a hill, through relatively very long or very short grass, across difficult terrain, etc., or when driving parts of the lawn mower 100 begin to deteriorate from, e.g., damage or wear-and-tear (e.g., the drive belt 126 may extend after long periods of use, so as to increase slack and reduce belt tension in an amount not accounted for in the transmission 120 target angular position determination).

Figure 6:
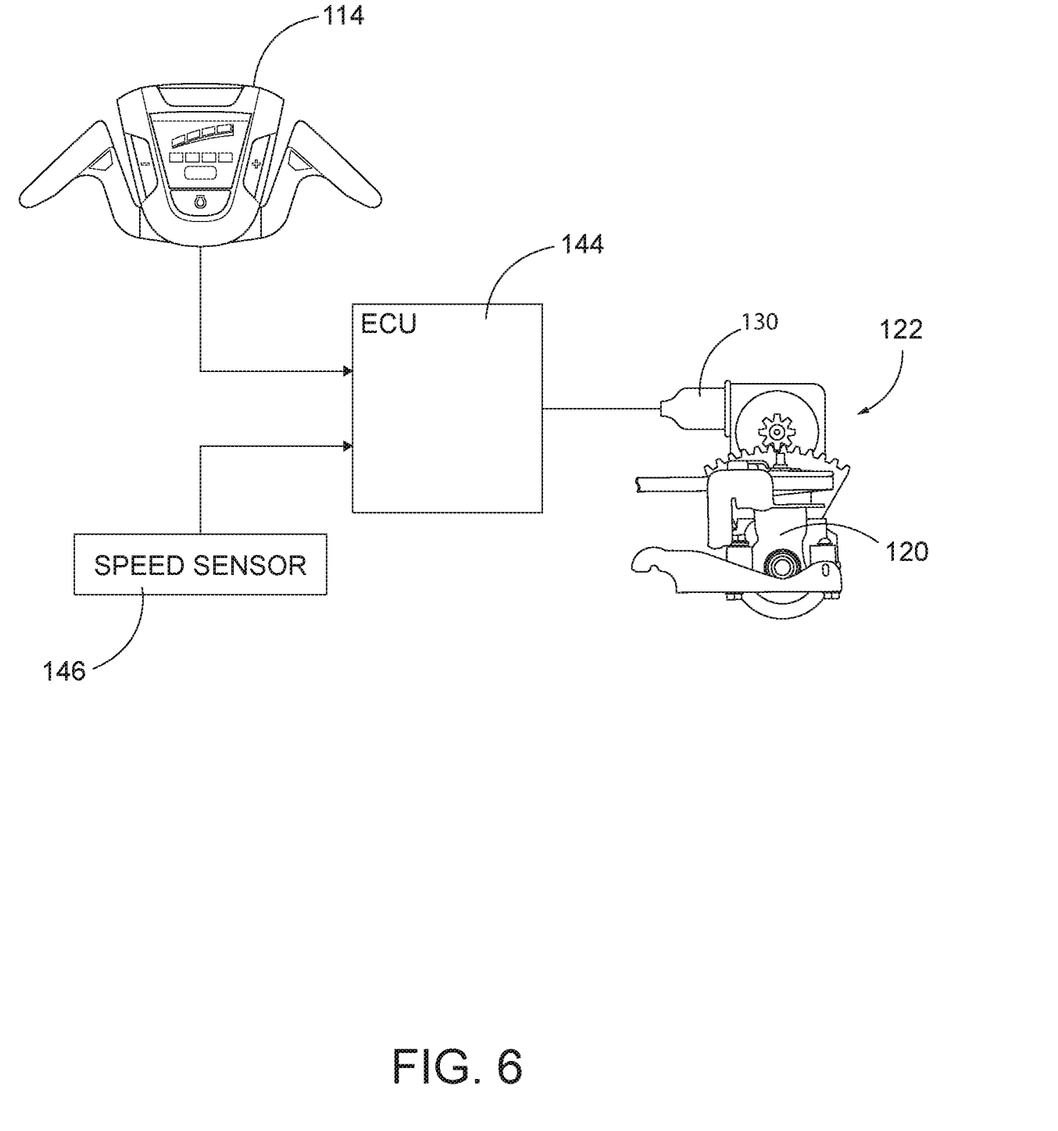
FIG. 6 is a schematic illustration of a feedback control loop for controlling a driving speed of the lawn mower using the transmission speed control system.

To ensure precise control of the driving speed of the lawn mower 100, even when the lawn mower 100 is operated outside of ordinary driving conditions, the transmission speed control system 118 can further include a speed sensor 146 (FIG. 2) in communication with the ECU 144 to enable a feedback control loop (see FIG. 6). The speed sensor 140 can take the form of any known sensor capable of detecting the driving speed of the lawn mower 100. For example, the speed sensor 146 can be a variable reluctance or Hall-effect sensor provided to detect a rotational speed of the drive axle shaft 110. Alternatively, the speed sensor 146 can be provided via a Global Positioning System (GPS) or other known means.

The ECU 144 receives an input from the speed sensor 146 indicating the driving speed of the lawn mower 100. The ECU 144 can thereby detect when the driving speed of the lawn mower 100 differs from the target driving speed, and can make adjustments to the angular position of the transmission 120 to reduce the difference.

Specifically, the ECU 144 is programmed to determine a difference between the target driving speed and the driving speed detected by the speed sensor 146. When a value of the difference is greater than a predetermined value, the ECU 144 determines a target adjusted angular position of the transmission 120 to reduce the value of the difference to be less than the predetermined value, and controls the motor 130 of the transmission positioning assembly 122 to adjust the angular position of the transmission 120 to the target adjusted angular position. To account for short term variances in speed, the ECU 144 can be configured to detect that the difference is greater than the predetermined value for longer than a predetermined time period before proceeding to determine and adjust the angular position of the transmission 120.

With respect to the predetermined value against which the difference between the target and detected driving speeds are compared, the predetermined value can be arbitrarily set or determined, e.g., experimentally or computationally. The predetermined value may be set as a value representing a difference between the target and detected driving speeds which would be noticed by the user of the lawn mower 100. Similarly, the predetermined time period can be arbitrarily set or determined, e.g., experimentally or computationally, as a time period longer than that during which the lawn mower 100 would experience a change in driving speed during normal operation, for example, when the lawn mower 100 passes through small areas of longer grass, encounters minor variances in the grading of the ground, etc.

When the ECU 144 determines that the difference between the target and detected driving speeds is greater than the predetermined value, the ECU 144 determines the target adjusted angular position of the transmission 120 to reduce the difference to be less than the predetermined difference. In this regard, the target adjusted angular position of the transmission 120 is determined to be relatively nearer than a current angular position to the first angular position when the driving speed detected by the speed sensor 146 is greater than the target driving speed (which would increase the driving speed of the lawn mower). The adjusted angular position of the transmission 120 is determined to be relatively nearer than the current angular position to the second angular position when the driving speed detected by the speed sensor 146 is less than the target driving speed (which would decrease the driving speed of the lawn mower). The exact amount of the adjustment is determined by the ECU 144 to be, e.g., proportional or related to an amount and magnitude of the difference between the target and detected driving speeds, according to predetermined or defined relationships between a degree of angular position change of the transmission 120 and a change in the driving speed of the lawn mower 100, which can be predetermined via known means or methods, and programmed in the ECU 144.

Figure 7:
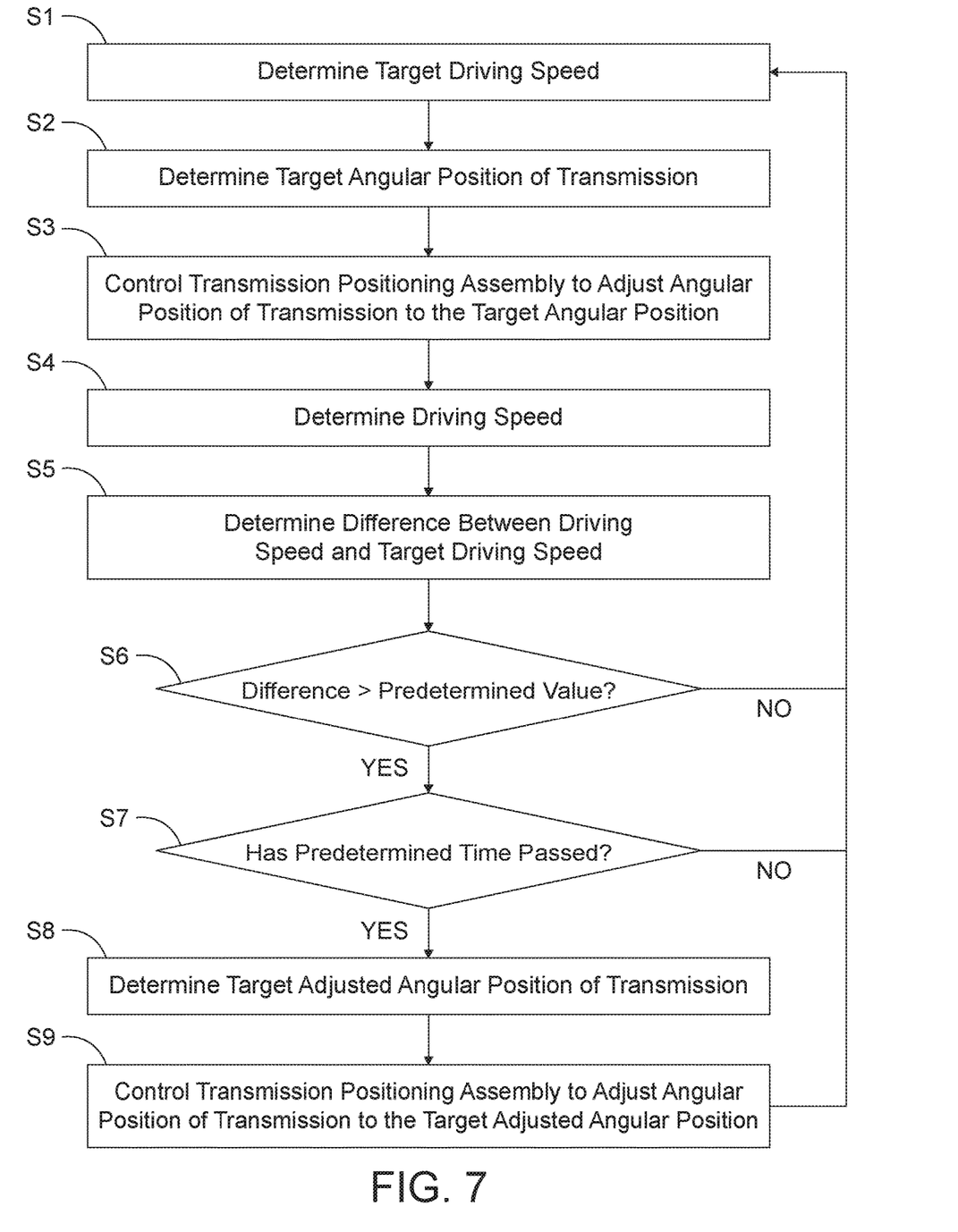
FIG. 7 is a flow chart showing a method for controlling the driving speed of the lawn mower using the transmission speed control system.

Referring to FIGS. 6 and 7, a method for controlling the driving speed of the lawn mower 100 using the transmission speed control system 118 begins by determining the target driving speed of the lawn mower 100 (S1). This determination is made using the ECU 144, for example, by designation by the user via the user interface 114 or any other above-discussed or known mechanism for setting the target driving speed.

Thereafter, the ECU 144 determines the target angular position of the transmission 120, which is the angular position of the transmission 120 that yields the belt tension that causes the transmission 120 to exert the rotational drive force on the drive axle shaft 110 to drive the lawn mower 100 at the target driving speed (S2), and controls the transmission positioning assembly 122 to adjust the angular position of the transmission 120 to the target angular position (S3). Specifically, the ECU 144 control the motor 130 to drive the spur gear 140 and the transmission angle control plate 142.

The method then proceeds to the feedback control loop by the ECU 144 determining the driving speed of the lawn mower 100 based on the driving speed detected by the speed sensor 146 (S4). The ECU 144 then compares the target driving speed and the driving speed detected by the speed sensor 146, and determines a difference therebetween (S5). If the value of the difference is less than the predetermined value (S6, NO), then the method returns to loop from the beginning.

If the value of the difference is greater than or equal to the predetermined value (S6, YES), then the method proceeds to determine if the difference greater than the predetermined value is maintained for longer than the predetermined period of time (S7). If not (S6 or S7, NO), then the method returns to determining the target driving speed (S1). If so (S6 and S7, YES), then the ECU 144 determines the target adjusted angular position of the transmission 120 to reduce the value of the difference to be less than the predetermined value (S8) and controls the transmission positioning assembly 122 to adjust the angular position of the transmission 120 to the target adjusted angular position (S9).

Specifically, the target adjusted angular position of the transmission 120 is determined to be relatively nearer than the current angular position to the first angular position when the driving speed detected by the speed sensor 146 is greater than the target driving speed. The target adjusted angular position of the transmission 120 is determined to be relatively nearer than the current angular position to the second angular position when the driving speed detected by the speed sensor 146 is less than the target driving speed.

The above description of a particular embodiment of the lawn mower 100 and the transmission speed control system 118 is meant to be exemplary. It is to be appreciated that various modifications to the specific structural features described above can be varied while remaining within the scope of the application. For example, the precise arrangement and structural relationship between the transmission speed control system 118 and the engine 116 of the lawn mower 100, or between the transmission speed control system 118 and the drive axle shaft 110 or other mechanism for driving the lawn mower 100, can be varied. Additionally, while the transmission speed control system 118 is described as being employed with a lawn mower 100, it is amenable for incorporation in different types of vehicles.

Among other variations, the transmission speed control system 118 can be employed with a front wheel drive lawn mower, or with an autonomous lawn mower which receives inputs, such as the target and detected driving speeds, from an external source. Additionally, the engine 116 can be replaced with a DC motor.

As used herein, the ECU refers to a computer-related entity (e.g., hardware, firmware, instructions in execution, combinations thereof). The ECU may include, for example, one or more processors executing a process, all forms of computer memory, an object, an executable, a thread of execution, and a computer. The ECU can be localized on one computer and/or can be distributed between multiple computers.

A "processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multi-core processors and co-processors and other multiple single and multicore processor and co-processor architectures.

The processor can include logic circuitry to execute actions and/or algorithms. Logic circuitry may include, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein with reference to the ECU, can include volatile memory and/or nonvolatile memory. Nonvolatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

Communication, used in context of the ECU herein, refers to a connection through which signals, physical communications, and/or logical communications can be sent or received. The connection can include a wireless interface, a physical (wired) interface, a data interface, and/or an electrical interface, including communicable connections enabled across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "database," as used herein, is used to refer to a table. In other examples, "database" can be used to refer to a set of tables. In still other examples, "database" can refer to a set of data stores and methods for accessing and/or manipulating those data stores. A database can be stored, for example, at a disk and/or a memory.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A transmission speed control system for a walk-behind lawn mower, comprising:
   a transmission including a transmission pulley adapted to engage and be rotatably driven by a drive belt driven by an engine of the lawn mower, the transmission configured to translate rotation of the transmission pulley to a rotational drive force exerted on a drive axle shaft of the lawn mower to drive the lawn mower, the transmission provided to be tiltable between a first angular position and a second angular position within the lawn mower; and
   a transmission positioning assembly including a motor and a gear assembly secured to a frame of the lawn mower and the transmission, the gear assembly translating a drive force from the motor to tilt the transmission to and hold the transmission at any angular position between the first angular position and the second angular position,
   wherein a belt tension between the drive belt and the transmission pulley continuously increases from a minimum belt tension when the transmission is in the first angular position to a maximum belt tension when the transmission is in the second angular position, and the rotational drive force exerted on the drive axle shaft by the transmission and a resulting driving speed of the lawn mower vary proportionally with the belt tension,
   wherein the gear assembly comprises:
      a worm connected to and rotationally driven by the motor,
      a spur gear operably engaged with the worm to be driven to rotate by rotation of the worm, and
      a transmission angle control plate fixedly secured to the transmission and operably engaged with the spur gear to be driven to rotate by rotation of the spur gear, wherein rotation of the transmission angle control plate tilts the transmission about the drive axle shaft so that an axis of rotation of the transmission to change the angular position of the transmission is along an axial direction of the drive axle shaft.

2. The transmission speed control system according to claim 1, further comprising an electronic control unit, including at least one processor, that controls the transmission positioning assembly to adjust the angular position of the transmission.

3. The transmission speed control system according to claim 2, wherein the electronic control unit:
   determines a target driving speed of the lawn mower;
   determines a target angular position of the transmission, which is the angular position of the transmission that yields the belt tension that causes the transmission to exert the rotational drive force on the drive axle shaft to drive the lawn mower at the target driving speed; and
   controls the transmission positioning assembly to adjust the angular position of the transmission to the target angular position.

4. The transmission speed control system according to claim 3, further comprising a user interface device in communication with the electronic control unit and through which a user inputs the target driving speed, wherein the electronic control unit determines the target driving speed to be the target driving speed input by the user.

5. The transmission speed control system according to claim 3, further comprising a speed sensor that detects a driving speed of the lawn mower,
   wherein the electronic control unit determines a difference between the target driving speed and the driving speed detected by the speed sensor, and
   when a value of the difference is greater than a predetermined value, determines a target adjusted angular position of the transmission to reduce the value of the difference to be less than the predetermined value, and controls the transmission positioning assembly to adjust the angular position of the transmission to the target adjusted angular position.

6. The transmission speed control system according to claim 5, wherein the electronic control unit determines the target adjusted angular position of the transmission to be:
relatively nearer than a current angular position to the first angular position when the driving speed detected by the speed sensor is greater than the target driving speed, and
relatively nearer than the current angular position to the second angular position when the driving speed detected by the speed sensor is less than the target driving speed.

7. The transmission speed control system according to claim 6, wherein the gear assembly comprises:
a worm wheel operably engaged with the worm to be driven to rotate by rotation of the worm;
the spur gear fixed to the worm wheel to integrally rotate therewith about a common axis of rotation; and
the motor is configured to drive the spur gear, through the worm and the worm wheel, in a first direction and a second direction,
the electronic control unit controls the motor to drive the spur gear, through the worm and the worm wheel, in the first direction to move the angular position of the transmission toward the first angular position, and in the second direction to move the angular position of the transmission toward the second angular position.

8. The transmission speed control system according to claim 5, wherein
the gear assembly comprises:
a worm wheel operably engaged with the worm to be driven to rotate by rotation of the worm;
the spur gear fixed to the worm wheel to integrally rotate therewith about a common axis of rotation; and
the motor is configured to drive the spur gear, through the worm and the worm wheel, in a first direction and a second direction,
the electronic control unit controls the motor to drive the spur gear, through the worm and the worm wheel, in the first direction to move the angular position of the transmission toward the first angular position, and in the second direction to move the angular position of the transmission toward the second angular position.

9. The transmission speed control system according to claim 2, wherein the gear assembly comprises:
a worm wheel operably engaged with the worm to be driven to rotate by rotation of the worm;
the spur gear fixed to the worm wheel to integrally rotate therewith about a common axis of rotation; and
the motor is configured to drive the spur gear, through the worm and the worm wheel, in a first direction and a second direction,
the electronic control unit controls the motor to drive the spur gear, through the worm and the worm wheel, in the first direction to move the angular position of the transmission toward the first angular position, and in the second direction to move the angular position of the transmission toward the second angular position.

10. The transmission speed control system according to claim 1, wherein the gear assembly comprises:
a worm wheel operably engaged with the worm to be driven to rotate by rotation of the worm; and
the spur gear fixed to the worm wheel to integrally rotate therewith about a common axis of rotation.

11. The transmission speed control system according to claim 10, wherein the transmission is secured to the drive axle shaft with the drive axle shaft passing therethrough.

12. The transmission speed control system according to claim 11, wherein in the first angular position a front portion of the transmission in a longitudinal direction of the lawn mower, which is perpendicular to an axial direction of the drive axle shaft, is disposed relatively lower in a height direction, which is perpendicular to the axial direction of the drive axle shaft and the longitudinal direction of the lawn mower, than a rear portion of the transmission in the longitudinal direction of the lawn mower, and in the second angular position the front portion of the transmission is disposed substantially level in the height direction with the rear portion of the transmission.

13. The transmission speed control system according to claim 1, wherein the transmission is secured to the drive axle shaft with the drive axle shaft passing therethrough.

14. The transmission speed control system according to claim 13, wherein in the first angular position a front portion of the transmission in a longitudinal direction of the lawn mower, which is perpendicular to an axial direction of the drive axle shaft, is disposed relatively lower in a height direction, which is perpendicular to the axial direction of the drive axle shaft and the longitudinal direction of the lawn mower, than a rear portion of the transmission in the longitudinal direction of the lawn mower, and in the second angular position the front portion of the transmission is disposed substantially level in the height direction with the rear portion of the transmission.

15. A walk-behind lawn mower, comprising:
a frame;
an engine mounted on the frame;
a drive axle shaft secured to the frame and having a drive wheel;
a drive pulley driven by the engine, the drive pulley engaging and driving a drive belt;
a transmission speed control system for driving the drive axle shaft, the transmission speed control system comprising:
a transmission including a transmission pulley adapted to engage and be rotatably driven by the drive belt, the transmission configured to translate rotation of the transmission pulley to a rotational drive force exerted on the drive axle shaft to drive the lawn mower, the transmission provided to be tiltable between a first angular position and a second angular position within the lawn mower, and
a transmission positioning assembly including a motor and a gear assembly secured to the frame and the transmission, the gear assembly translating a drive force from the motor to tilt the transmission to and hold the transmission at any angular position between the first angular position and the second angular position; and
an electronic control unit, including at least one processor, that controls the transmission positioning assembly to adjust the angular position of the transmission,
wherein a belt tension between the drive belt and the transmission pulley continuously increases from a minimum belt tension when the transmission is in the first angular position to a maximum belt tension when the transmission is in the second angular position, and the rotational drive force exerted on the drive axle by the transmission and a resulting driving speed of the lawn mower vary proportionally with the belt tension, wherein the transmission is secured to the drive axle shaft with the drive axle shaft passing therethrough, and is tiltable by rotating about the drive axle shaft so that an axis of rotation of the transmission to change the angular position thereof is along an axial direction of the drive axle shaft, wherein the gear assembly comprises:
- a worm connected to and rotationally driven by the motor,
- a worm wheel operably engaged with the worm to be driven to rotate by rotation of the worm,
- a spur gear fixed to the worm wheel to integrally rotate therewith about a common axis of rotation, and
- a transmission angle control plate fixedly secured to the transmission and operably engaged with the spur gear to change the angular position of the transmission as the spur gear is rotated by driving of the motor, wherein the motor is configured to drive the spur gear, through the worm and the worm wheel, in a first direction and a second direction, wherein the electronic control unit controls the motor to drive the spur gear, through the worm and the worm wheel, in the first direction to move the angular position of the transmission toward the first angular position, and in the second direction to move the angular position of the transmission toward the second angular position.

16. The walk-behind lawn mower according to claim 15, wherein the electronic control unit:
- determines a target driving speed of the lawn mower;
- determines a target angular position of the transmission, which is the angular position of the transmission that yields the belt tension that causes the transmission to exert the rotational drive force on the drive axle shaft to drive the lawn mower at the target driving speed; and
- controls the transmission positioning assembly to adjust the angular position of the transmission to the target angular position.

17. A method for controlling a driving speed of a walk-behind lawn mower using a transmission speed control system which comprises:
- a transmission including a transmission pulley adapted to engage and be rotatably driven by a drive belt driven by an engine of the lawn mower, the transmission configured to translate rotation of the transmission pulley to a rotational drive force exerted on a drive axle shaft of the lawn mower to drive the lawn mower, the transmission provided to be tiltable between a first angular position and a second angular position within the lawn mower;
- a transmission positioning assembly including a motor and a gear assembly secured to a frame of the lawn mower and the transmission, the gear assembly translating a drive force from the motor to tilt the transmission to and hold the transmission at any angular position between the first angular position and the second angular position; and
- an electronic control unit, including at least one processor, that controls the transmission positioning assembly to adjust the angular position of the transmission, wherein a belt tension between the drive belt and the transmission pulley continuously increases from a minimum belt tension when the transmission is in the first angular position to a maximum belt tension when the transmission is in the second angular position, and the rotational drive force exerted on the drive axle by the transmission and a resulting driving speed of the lawn mower vary proportionally with the belt tension, the method comprising:
- determining, using the electronic control unit, a target driving speed of the lawn mower;
- determining, using the electronic control unit, a target angular position of a transmission, which is the angular position of the transmission that yields the belt tension that causes the transmission to exert the rotational drive force on the drive axle shaft to drive the lawn mower at the target driving speed; and
- controlling, using the electronic control unit, the transmission positioning assembly to adjust the angular position of the transmission to the target angular position, wherein the transmission speed control system further comprises a speed sensor that detects a driving speed of the lawn mower, and the method further comprises:
- determining the driving speed based on the driving speed detected by the speed sensor;
- determining, using the electronic control unit, a difference between the target driving speed and the driving speed detected by the speed sensor; and
- when a value of the difference is greater than a predetermined value, determining, using the electronic control unit, an adjusted angular position of the transmission to reduce the value of the difference to be less than the predetermined value; and
- controlling, using the electronic control unit, the transmission positioning assembly to adjust the angular position of the transmission to the adjusted angular position.

* * * * *